United States Patent
Rees et al.

(10) Patent No.: US 6,460,935 B1
(45) Date of Patent: Oct. 8, 2002

(54) BUCKLE PRETENSIONER

(76) Inventors: Elizabeth Rees, 19 Hawick St., Carlisle, Cumbria (GB), CA25UW; Alan George Smithson, Garden Cottage, Edmond Castle, Wetheral, Cumbria (GB), CA4 8HD; David Burke, 34 Rosebury Rd., Stanwix, Carlisle, Cumbria (GB), CA39HU; Andrew John Downie, 44 St. Edmunds Park, Carlisle, Cumbria (GB), CA26TS; Carlo Martellini, 1 Croftlands Cottage, Headsnook, Cumbria (GB), CA49AF; Richard Harman, 7 Halls Nook, Rosemarket, Pembrokeshire (GB), SA731JR; David Blackadder, Rose Bank, Corby Hill, Carlisle, Cumbria (GB), CA48QG ( * ) Notice: Subject to any disclaimer, the term of this patent is extended or adjusted under 35 U.S.C. 154(b) by 0 days.

(21) Appl. No.: 09/445,049

(22) PCT Filed: Jun. 2, 1998

(86) PCT No.: PCT/GB98/01602

§ 371 (c)(1),
(2), (4) Date: Feb. 23, 2000

(87) PCT Pub. No.: WO98/55345

PCT Pub. Date: Dec. 10, 1998

(30) Foreign Application Priority Data

Jun. 2, 1997 (GB) .............................................. 9711348

(51) Int. Cl.$^7$ .............................................. A47C 31/00

(52) U.S. Cl. ........................ 297/478; 297/480; 280/806

(58) Field of Search .................................. 297/476, 478, 297/479, 480; 280/805, 806; 242/374

(56) References Cited

U.S. PATENT DOCUMENTS

| | | | | |
|---|---|---|---|---|
| 3,845,836 A | * | 11/1974 | Bendler et al. | 297/480 |
| 5,443,222 A | | 8/1995 | Mödinger et al. | |
| 5,611,604 A | * | 3/1997 | Thomas et al. | 297/478 |
| 5,634,690 A | * | 6/1997 | Watanabe et al. | 297/480 |
| 5,794,978 A | | 8/1998 | Nishide | |
| 5,887,897 A | * | 3/1999 | Gill et al. | 297/480 X |
| 5,927,756 A | * | 7/1999 | Wier | 297/480 X |
| 6,068,664 A | * | 5/2000 | Meyer et al. | 297/478 X |
| 6,095,615 A | * | 8/2000 | Wier | 297/480 |
| 6,264,281 B1 | * | 7/2001 | Dukatz et al. | 297/480 |

FOREIGN PATENT DOCUMENTS

| | | |
|---|---|---|
| EP | 0 629 531 A1 | 6/1994 |
| EP | 0 724 987 B1 | 1/1996 |
| GB | 2 288 317 A | 10/1995 |
| GB | 2 288 317 B | 3/1998 |
| GB | 2 323 769 A | 10/1998 |

* cited by examiner

*Primary Examiner*—Peter M. Cuomo
*Assistant Examiner*—Stephen Vu
(74) *Attorney, Agent, or Firm*—Markell Seitzman

(57) ABSTRACT

A buckle pretensioner for a vehicle safety restraint comprising a buckle head (1) for receiving a buckle tongue to secure safety restraint webbing about a vehicle occupant in a three-point belt system; a cable (2) connected to the buckle head (1); and device (7) for rapidly withdrawing the cable in a belt tightening direction, the withdrawing device (7) comprising a force reservoir (8), and driving mechanism (6), and being of a compact construction through the use of set-up gearing (3,4) to magnify linear movement produced by the force reservoir (8) which may be a pyrotechnic gas generator or a spring. The driving mechanism (8) may be a piston-cylinder (6,8) or a rack and pinion. The gearing may comprise a pulley arrangement (3,4). Alternatively a roots motor or a gear pump could be used.

14 Claims, 7 Drawing Sheets

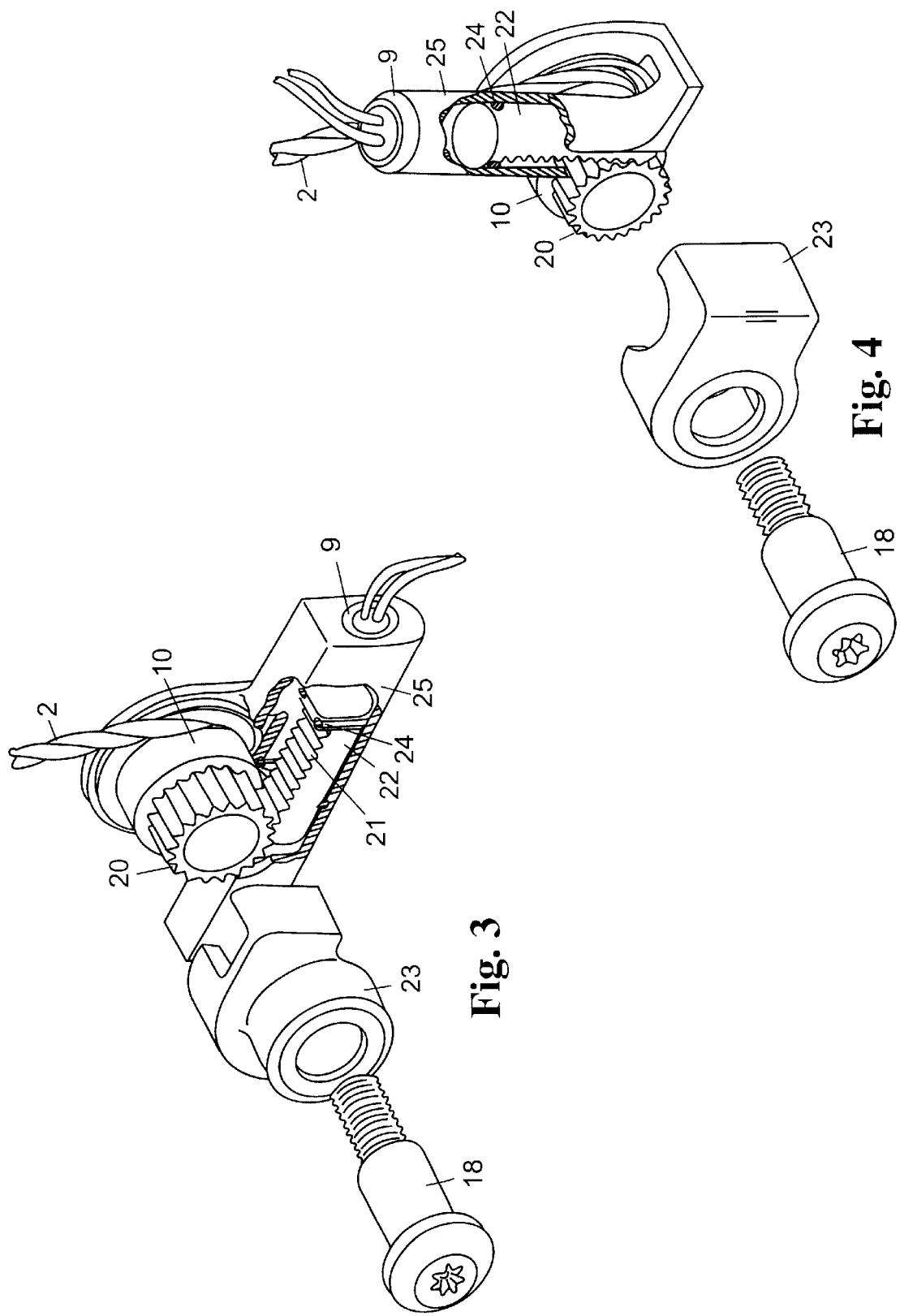

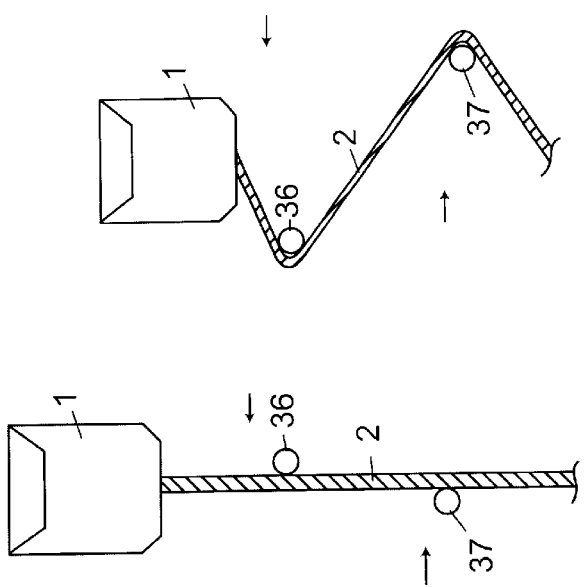
Fig. 6A
Fig. 6B
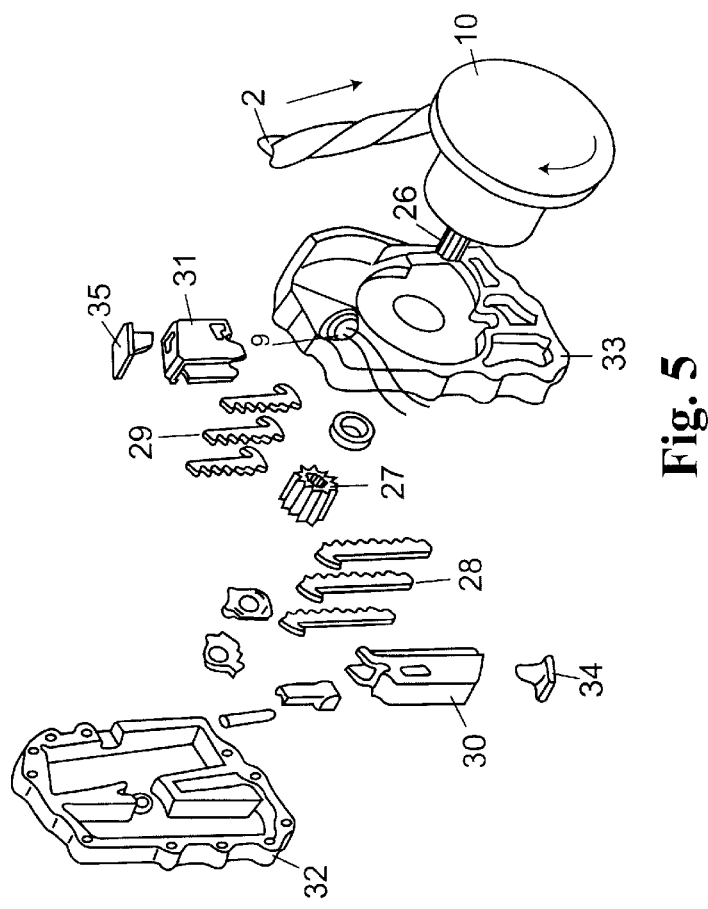
Fig. 5

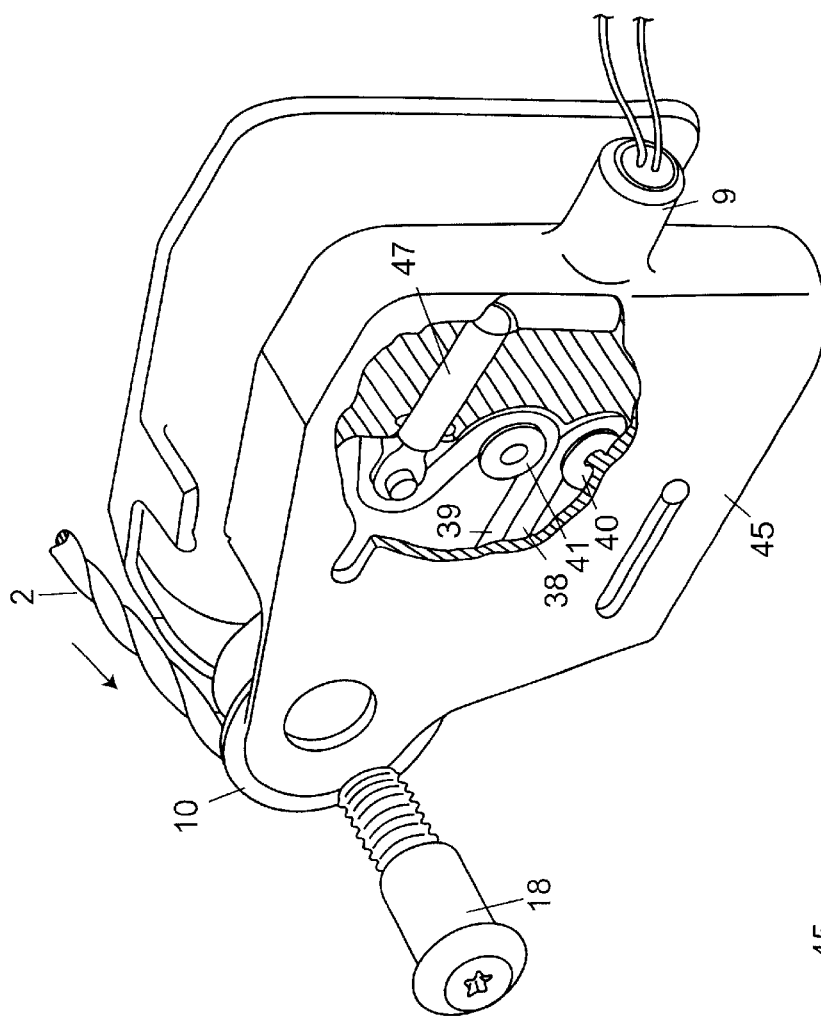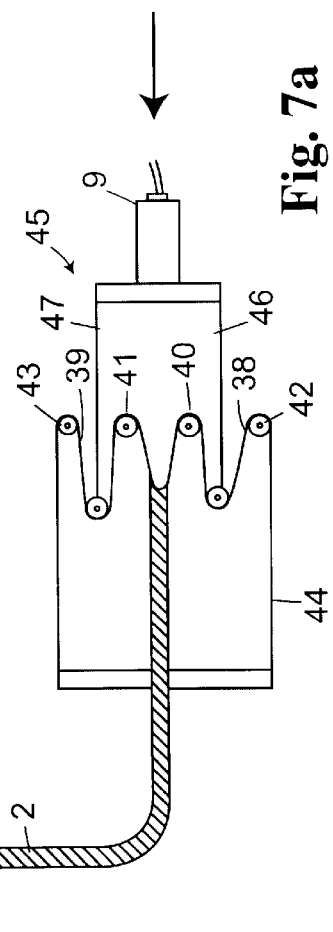
Fig. 7a
Fig. 7b

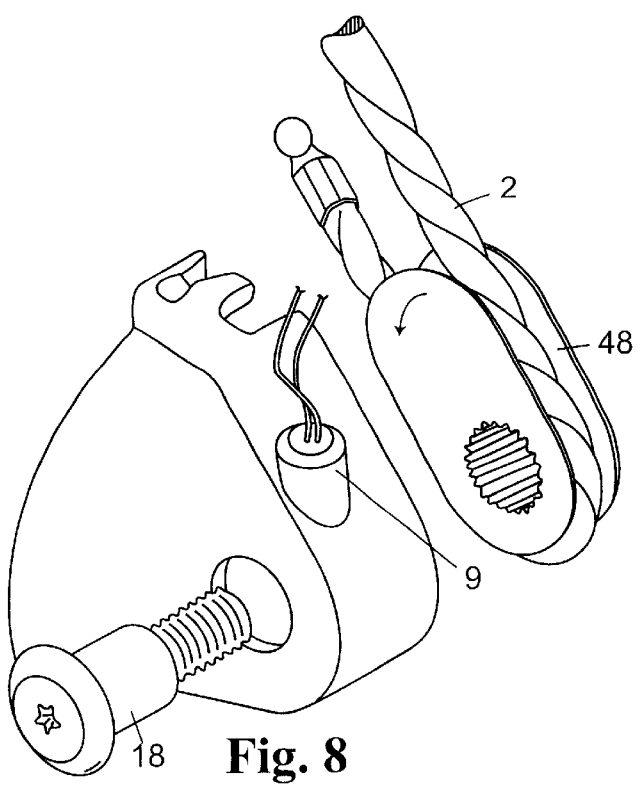
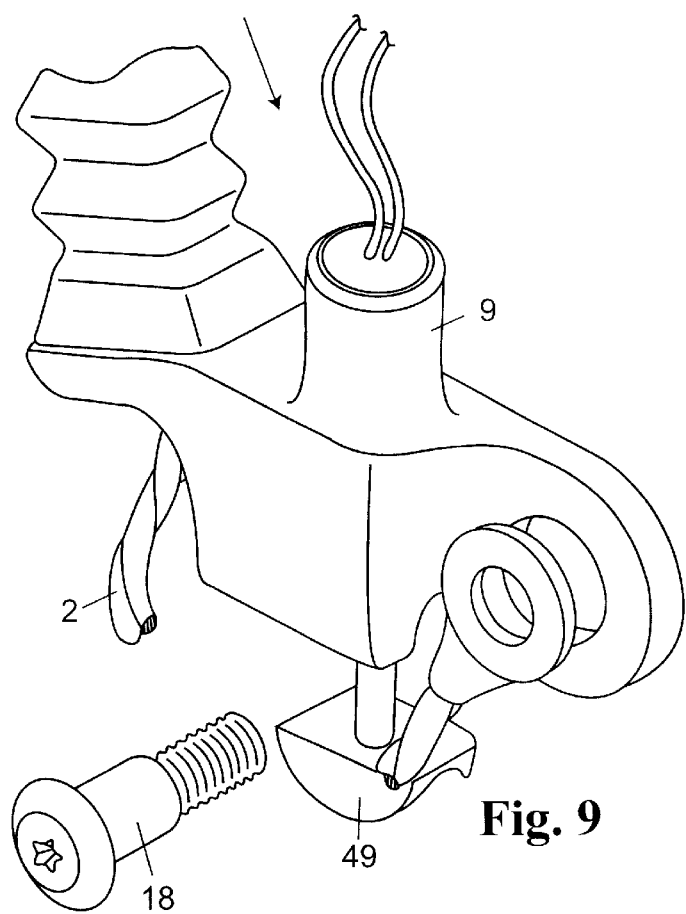

BUCKLE PRETENSIONER

BACKGROUND OF THE INVENTION

The present invention relates to a buckle pretensioner for a vehicle safety restraint.

Pretensioners are used to rapidly withdraw a length of seat belt webbing in the event of an emergency. This takes up slack in the seat belt which might be caused by bulky clothing or by a vehicle occupant being out of position such as when leaning forward in the seat, or when seated skewed for example when asleep. The purpose of eliminating this slack is to more securely restrain the vehicle occupant at the onset of emergency conditions, and to more correctly position him for maximum effect of any secondary safety restraint such as an airbag.

Pretensioners may be situated at the retractor end of a three-point safety belt to rapidly rewind the belt webbing, or alternatively at the buckle end to rapidly pull back the buckle mounting.

Known buckle pretensioners use a piston-cylinder arrangement in which a piston connected to the buckle mounting is pushed rapidly along a cylinder by the force of a spring or more recently by pyrotechnic means which release a sudden rush of gas. Such arrangements are bulky and difficult to fit unobtrusively in a vehicle, particularly in the smaller models of vehicle which are popular nowadays.

SUMMARY OF THE INVENTION

It is an object of the present invention to provide an improved buckle pretensioner and particularly a more compact design.

According to the present invention there is provided a buckle pretensioner for a vehicle safety restraint comprising a buckle head for receiving a buckle tongue to secure safety restraint webbing about a vehicle occupant in a three-point belt system, the pretensioner comprising; a cable connected to the buckle head and means for rapidly withdrawing the cable in a belt tightening direction, the withdrawing means comprising a force generator or reservoir and driving means and being more compact than hitherto known.

According to a first embodiment of the invention the pretensioner further comprises step-up gearing means for converting a linear movement of a predetermined magnitude, produced by the force generator, into a linear movement of the cable of more than the predetermined magnitude, preferably a multiple of the predetermined magnitude.

Gearing arrangements were not previously considered viable for pretensioners, particularly buckle mounted pretensioners because they increase the torque which must be generated by the driving means, the maximum torque from traditional driving means was limited. However the improvements in pyrotechnic force generators means that sufficient torque can now be generated rapidly enough.

The step-up gearing may comprise a multiple pulley arrangement, such that the withdrawal means operates on a small diameter pulley fixedly connected to rotate with a large diameter pulley about which the cable is wound.

This arrangement allows a relatively simple force reservoir to be used in the pretensioner because the necessary locking devices can be included in the pulley arrangement, for example a simple ratchet and stop, rather than being part of the force generator (for example in the tube of a piston-cylinder pretensioner) as hitherto.

This embodiment can also be adapted relatively easily to incorporate load limiting features.

It is particularly applicable to the use of a piston-cylinder type pretensioner, either with a spring or a pyrotechnic force generator and the cylinder tube can in this case be made much shorter than in previous pretensioners.

However this embodiment is equally applicable to other types of force generator or to other driving means.

According to a second embodiment the driving means comprises a rack and pinion arrangement. The rack may be vertical or horizontal and is driven past the pinion wheel which is connected to rotate a pulley about which the cable is wound, by spring force or by a gas generator.

The pinion wheel may be driven by more than one rack, as for example in a system with two moving racks one on either side of the pinion wheel in opposite directions to reinforce each other's driving force. Their movement may be synchronised or phased depending on the pretensioning characteristics to be achieved.

Force generators such as gas generator may be integral with the racks.

Gearing arrangements may advantageously also be incorporated in this embodiment.

According to a third embodiment, the driving means comprises at least two pulley wheels across which the cable passes and means for extending the distance between the pulley wheels so as to withdraw the cable in the belt tightening direction.

Two pulley wheels may be arranged adjacent the path of the cable and driven in opposite directions across the path of the cable so as to withdraw the buckle head.

Alternatively two or preferably more pulley wheels are arranged with the buckle cable wound around them in an S configuration and one or more pulley wheels are driven parallel to the cable to withdraw the buckle head.

A further alternative is to use an elongate, elliptical or oval, cam pulley, arranged in normal use with the cable passing along both its long sides and round one of its short sides. Under pretensioning conditions this cam pulley is rotated rapidly through approximately 90° so that its long sides are tangential to the path of the cable from the buckle head, thus quickly and easily shortening the effective length of cable from the buckle head to its mounting position. The cam pulley may be driven by a pyrotechnically detonated gas generator or by a spring, or by other force generator means.

A gas generator driven cam faced piston may be used instead. The buckle cable passes over the outer arcuate cam face of the piston. When pretensioning is required the gas generator drives the piston a predetermined distance away from the buckle head and thus shortens the effective length of the cable to the buckle head.

According to a fourth embodiment of the invention the driving means comprises a rotating part with paddles or vanes driven by gas from a gas generator. This may be a wheel connected to the cable pulley, with or without gearing, or a helix coaxial with the cable pulley.

Alternatively a Roots motor or gear pump could be used comprising two camming figure-of-8 drive parts, one driven by a gas generator, the other coaxial with the cable pulley.

For a better understanding of the present invention and to show how the same may be carried into effect, reference will now be made to the accompanying drawings, in which:

BRIEF DESCRIPTION OF THE DRAWINGS

FIGS. 3 and 4 are exploded views of a second embodiment of the present invention.

FIG. 5 is an exploded view of the buckle pretensioner according to a variation of the second embodiment of the present invention.

FIG. 6 is a schematic cross-sectional view of a buckle pretensioner according to a third embodiment of the present invention.

FIG. 7 is a part cut-away view of a buckle pretensioner according to a variant of the third embodiment.

FIG. 8 is an exploded view of a buckle pretensioner according to another variant of the third embodiment.

FIG. 9 illustrates another variant of a buckle pretensioner according to the third embodiment.

DESCRIPTION OF THE PREFERRED EMBODIMENTS

Figure 1:
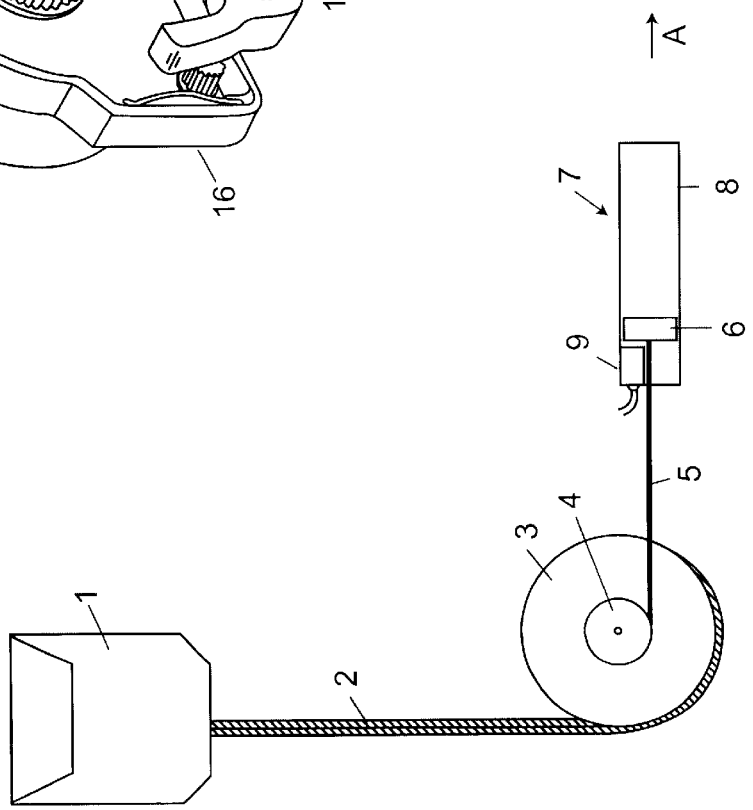
FIG. 1 is a schematic view of a compact buckle pretensioner according to one embodiment of the invention.

In FIG. 1 there is shown a buckle head 1 connected by a cable 2 to the outer diameter of a large diameter pulley wheel 3 Normally the cable would be covered with a plastic sheath and the buckle head is supported to be upstanding by a relatively stiff stalk but these are not shown in FIG. 1. The pulley wheel 3 is attached to a smaller diameter pulley wheel 4 and the outer diameter of this is connected by cable 5 to piston 6 of pretensioner 7. Piston 6 is arranged for sliding movement in the cylinder 8 and a gas generator 9 is arranged to be electrically detonated in the event of a crash being detected by crash sensors to release gas into the cylinder 8 to push piston 6 in the direction of arrow A. This has the advantage over traditional arrangements of providing a step up gearing of a ratio corresponding to the ratios of the circumferences of the two pulley wheels 3 and 4. Thus movement of the piston a predetermined length along the cylinder 8 will move the buckle head downwards by a larger length depending upon the gearing ratio. Thus a more compact linear pretensioner can be used.

Figure 2:
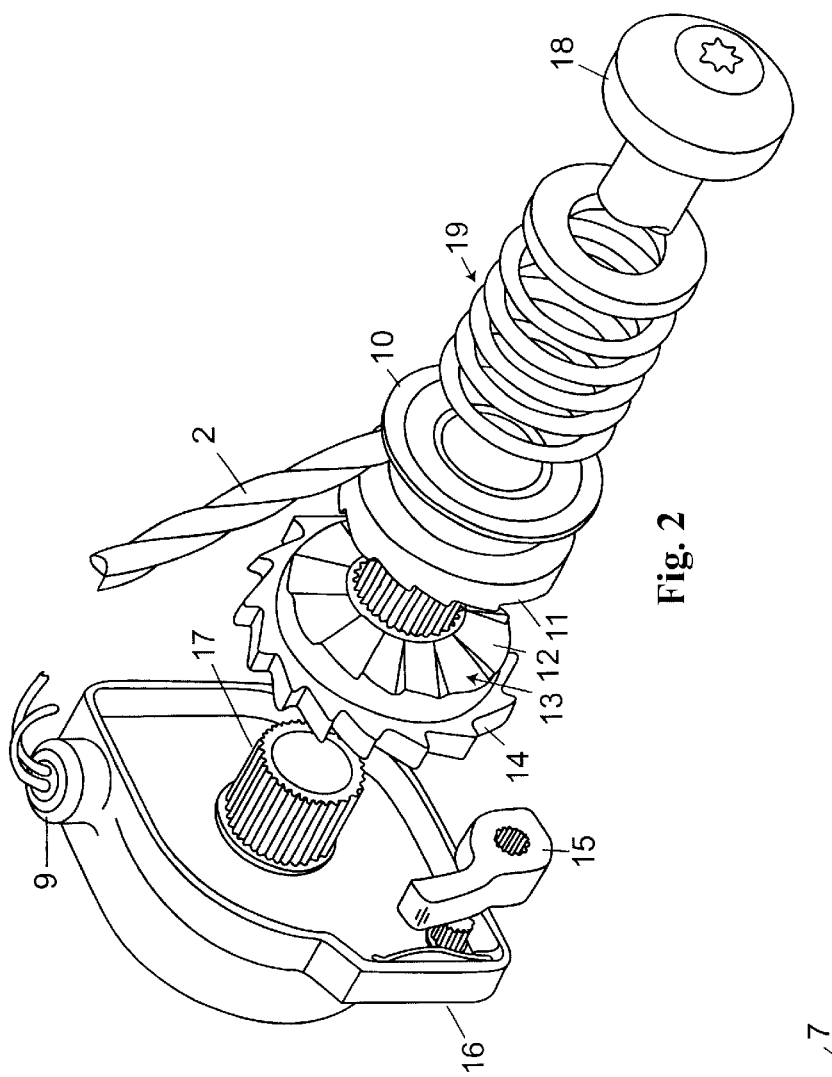
FIG. 2 is an exploded view of a buckle pretensioner according to a variant of the embodiment of Figure

FIG. 2 illustrates a load limiting arrangement in a compact buckle pretensioner. The buckle cable 2 passes from the buckle (not shown) around pulley wheel 10. One side of the wheel 10 is provided with sloping teeth which face correspondingly shaped sloping teeth 12 on the side of a locking ratchet 13 which has locking teeth 14 on its outer circumference. The locking teeth 14 can be engaged by locking pawl 15 which is rotatably mounted on the casing of a buckle pretensioner 16. The locking ratchet 13 and pulley wheel 10 are mounted on and coaxial with drive shaft 17 of the compact pretensioner 16. They are fixed on the drive shaft 17 by a bolt or rivet 18 and a spring clutch arrangement 19 is mounted between the rivet 18 and the pulley wheel 10. The pretensioner 16 is fired by electrically detonated gas generator 9. However, other firing means may be used.

Spring 19 acts on pulley wheel 10 to keep it engaged, via the interlocking sloping teeth 11 and 12, with the locking ratchet 13 up to a predetermined torque. Above the predetermined torque the sloping teeth 11 and 12 slip over each other and allow the pulley wheel 10 to rotate independently of the locking ratchet 13. Thus a maximum load is applied to the vehicle occupant restrained by this buckle.

FIG. 3 shows an alternative compact buckle pretensioner. The buckle head (not shown) is again connected via cable 2 to a pulley wheel 10. One section of the pulley wheel 10 has teeth 20 about its outer circumference. These teeth are engaged by corresponding teeth 21 on a horizontal rack 22 which is driven tangential to the pulley wheel 10 by electrically detonated gas generator 9. The pulley wheel 10 is protected by an outer cover 23 and is mounted for rotation and secured in place by rivet or bolt 18.

FIG. 4 shows an alternative arrangement to FIG. 3 in which the rack 22 is vertically mounted. Otherwise like parts are denoted by like reference numbers. In FIGS. 3 and 4 a seal 24 is situated between the rack 22 and pretensioner housing wall 25. This maximises the effect of the gas generator by preventing escape of gas along the side of the rack. In addition a locking means is provided so as to lock the rack and pinion in the pretensioned state after pretensioning to hold the buckle in the retracted position. This may, for example be, in the form of a locking ellipse as is well known in this field and as is shown in GB 1 351 447 and also is described in DE 42 34 132 both of which are incorporated herein by reference.

FIG. 5 shows an alternative compact buckle pretensioner. Again buckle cable 2 is connected to a pulley wheel 10 mounted on shaft 26. A tooth pinion wheel 27 is mounted on shaft 26. Two sets of tooth racks are arranged one on either side of the pinion wheel 27 so that when activated they move across the pinion wheel engaging the teeth and rotating it. Single or multiple racks 28 and 29 are mounted on respective support blocks 30, 31 and the parts are contained within housing parts 32, 33. An electrically detonated gas generator 9 acts to push the support blocks 30, 31 with their respective racks 28, 29 along the respective channels formed by the two parts of the covers 32, 33. The gas from the gas generator 9 pushes support members 30 and 31 by acting on planer surfaces of the support end members 34, 35.

FIG. 6 illustrates another embodiment of the invention. In FIG. 6a the buckle is shown in the normal use condition. In FIG. 6b the pretensioner has operated and the buckle head 2 has been retracted. This is effected by driving two rods 36 and 37 in opposite directions across the path of the cable 2 as indicated by the arrows.

FIG. 7 shows a similar arrangement in which multiple pulleys are introduced and the rods are pushed in a direction parallel to the buckle cable 2. This arrangement is even more compact than that of FIGS. 6a and 6b. FIG. 7a is a schematic diagram showing buckle head 1 attached via cable 2 to split cables 38, 39 which pass over respective pulley wheels 40, 41 and are fixed at points 42, 43 to the pretensioner housing 44. A drive arrangement 45 comprises two pusher fingers 46 and 47 which act on respective split cables 38, 39. An electrically detonated gas generator 9 or other drive means acts on the outer planer face of the pusher member 45 to drive it in the direction of the arrow thus pulling in a predetermined length of buckle cable 2 to retract the buckle head 1. This same arrangement is shown in FIG. 7b in part cut-away cross-sectional view where like references denote like parts.

FIG. 8 shows a similar arrangement in which the buckle cable 2 passes around an elliptic cam 48. The pretensioner drive means, such as electrically detonated gas generator 9, rotates this cam 48 in the direction of the arrow so as to take up a predetermined length of cable 2 and thus retract the buckle head.

FIG. 9 uses a pusher member 49, driven by gas generator 9 to take up a length of cable 2.

Figure 10:
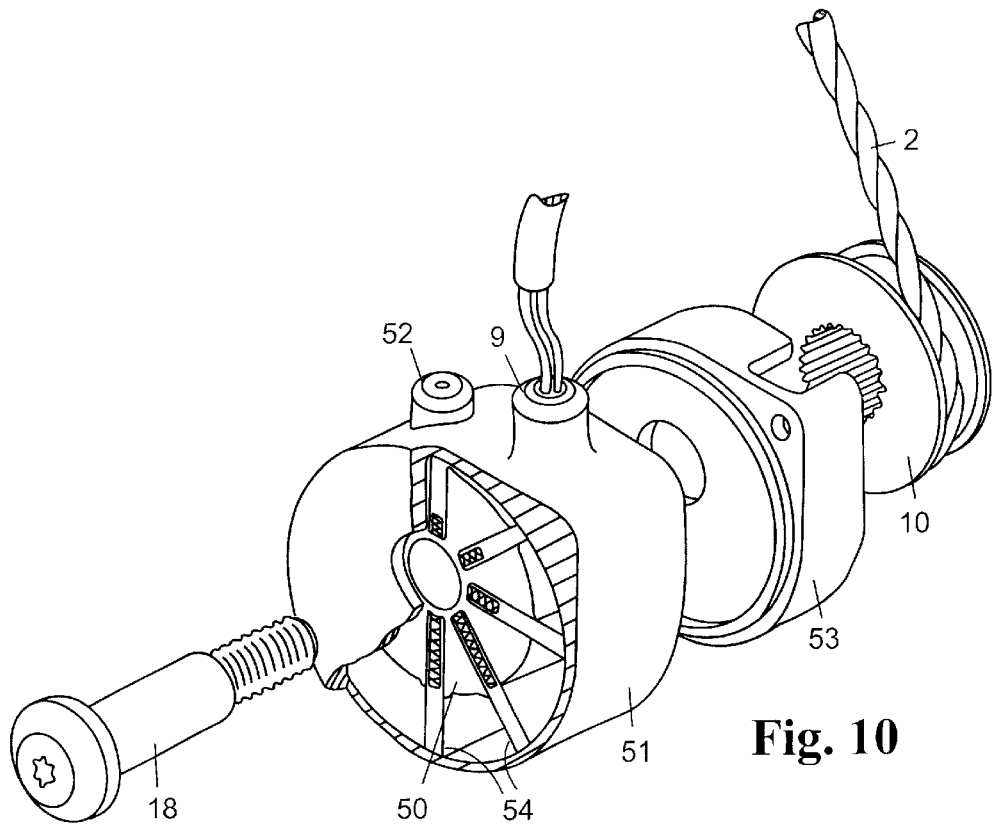
FIG. 10 is an exploded, and part cut-away view of a buckle pretensioner according to a fourth embodiment of the invention.

FIG. 10 shows an embodiment which uses a vane motor 50 as a pretensioning drive force. The vane motor 50 is contained within a housing 51 and is driven by electrically detonated gas generator 9. An exhaust port 52 is provided in the housing 51. The vane motor 50 is mounted for rotation via the fixing screw 18 which also passes through the motor drum casing 53 and a cable pulley wheel or winch drum 10 about which the buckle cable 2 passes.

Figure 11:
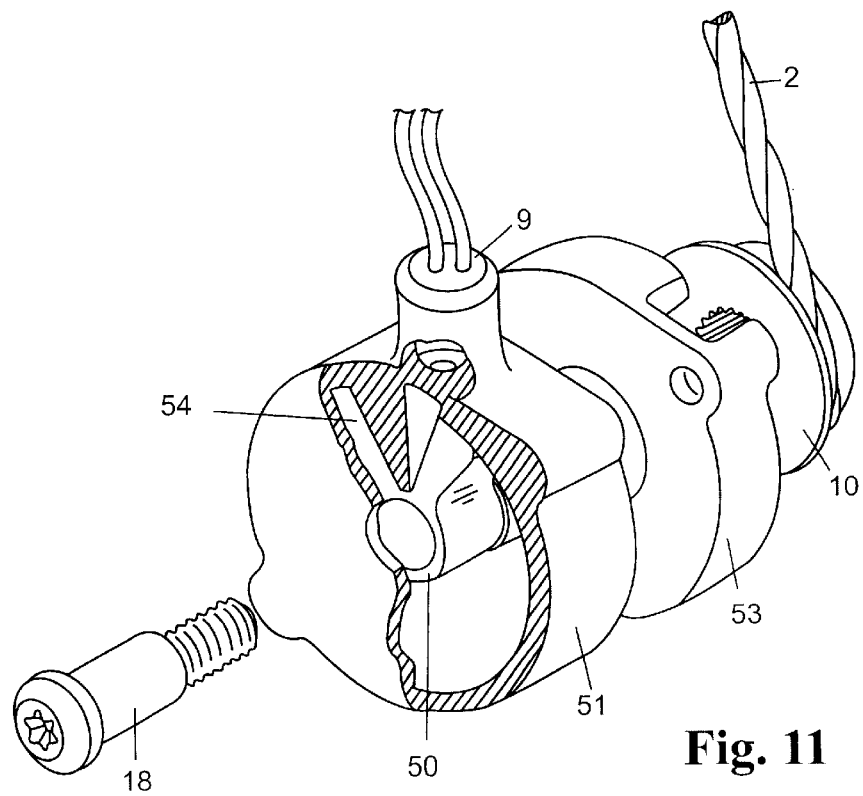
FIGS. 11, 12, 13 and 14 show alternative variants of the fourth embodiment of the invention.

FIG. 11 shows a variation of this vane motor which has a single paddle 54 instead of multiple paddles as in FIG. 10.

Figure 12:
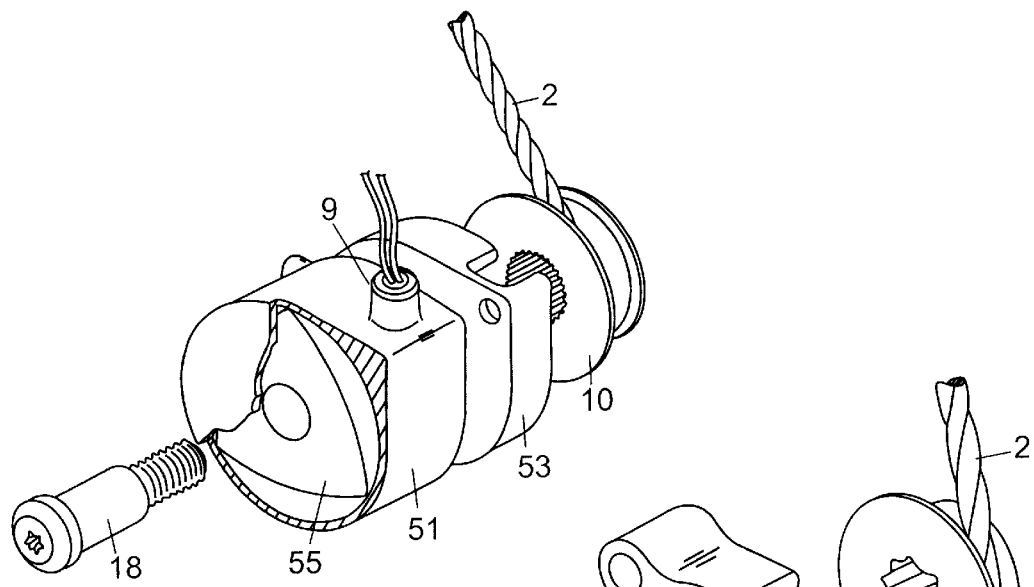

In FIG. 12 another variation is shown using a tri-lobe motor 55 in housing 51. Again this is driven by electrically detonated gas generator 9, though the person skilled in the art will see that there are many satisfactory alternative drive means.

Figure 13:
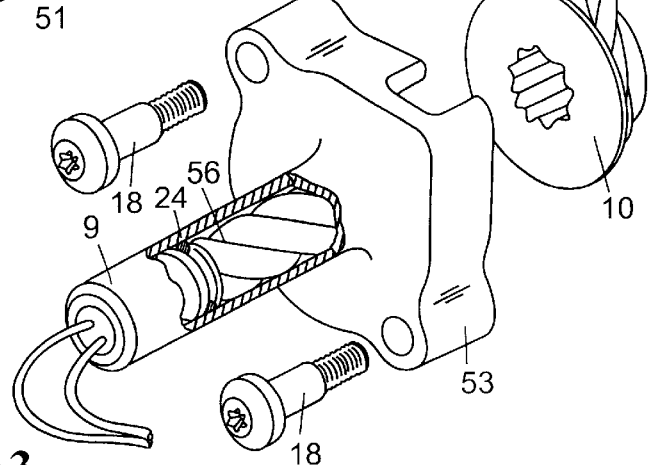

FIG. 13 shows a screw driven buckle pretensioner in which a helical drive shaft 56 is rotated by the force from electrically detonated gas generator 9. Seals 24 assist the gas generator 9 in operating efficiently. Preferably the pulley wheel on winch drum 10 has reverse locking to prevent it from rotating in a cable loosening direction.

Figure 14:
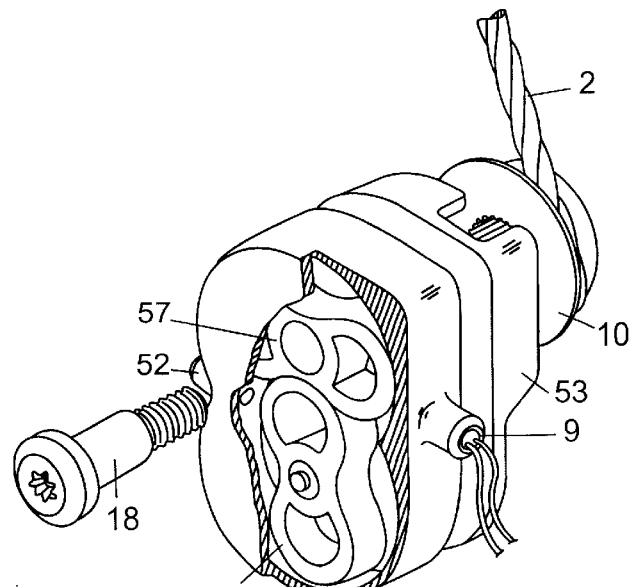

FIG. 14 is an embodiment using a rotor drive or a Roots motor. This comprises two figure-of-8 rotors 57, 58. The drive rotor 57 is mounted for rotation about fixing screw 18 which also fixes the winch drum 10 about which buckle cable 2 is wound. The idler rotor 58 is driven by gas generator 9 and this drives the drive rotor 57 and consequently winch drum 10 to pull back the buckle cable 2 and thus the buckle head (not shown).

It will be seen in all these examples that the buckle pretensioner is particularly compact and suitable for siting in convenient and unobtrusive positions in a vehicle close to the buckle head, or at a distance as required by the vehicle manufacturer.

What is claimed is:

1. The buckle pretensioner for a vehicle safety restraint comprising
    a buckle head for receiving a buckle tongue to secure safety restraint webbing about a vehicle occupant in a three-point belt system;
    a pinion wheel;
    a cable having a first end connected to the buckle head and a second end connected to the pinion wheel; and
    withdrawing means for rapidly withdrawing the cable in a belt tightening direction, comprising
        a force generator, and
        driving means for moving the cable, the driving means comprising a plurality of racks arranged to contact and rotate said pinion wheel upon activation of the force generator, to wind the cable onto the pinion wheel to pull the buckle head in a linear motion to tighten the safety restraint webbing around the occupant.

2. The buckle pretensioner according to claim 1 further comprising step-up gearing means for converting a linear movement of a predetermined magnitude, produced by the force generator, into a linear movement of the cable of more than the predetermined magnitude.

3. The buckle pretensioner according to claim 2 wherein the linear movement of the cable is a multiple of the predetermined magnitude.

4. The buckle pretensioner according to claim 2 wherein the step-up gearing comprises a multiple pulley arrangement, comprising a small diameter pulley and a large diameter pulley, fixedly connected to rotate together, and wherein the withdrawal means is connected to operate on the small diameter pulley and the cable passes over the large diameter pulley.

5. The buckle pretensioner according to claim 4 comprising a locking device for preventing reverse movement of the withdrawing means, wherein the locking device is located in the pulley arrangement.

6. The buckle pretensioner according to claim 5 wherein the locking device comprises a ratchet and stop.

7. The buckle pretensioner according to claim 1 wherein the force generator comprises pyrotechnic means for generating gases.

8. The buckle pretensioner according to claim 1 wherein the force generator comprises a spring.

9. The buckle pretensioner according to claim 1 further comprising load limiting means for permitting the cable to move in a direction opposite the tightening direction in a controlled manner.

10. The buckle pretensioner according to claim 1 wherein the driving means comprises a piston-cylinder arrangement.

11. The buckle pretensioner according to claim 1 wherein each of said racks is generally vertically oriented and movable generally vertically past the pinion wheel.

12. The buckle pretensioner according to claim 1 wherein the rack is generally horizontally oriented and movable generally horizontally past the pinion wheel.

13. The buckle pretensioner according to claim 1 comprising two movable racks arranged one on either side of the pinion wheel and movable in opposite directions to reinforce each other's driving force.

14. The buckle pretensioner according to claim 1 wherein the force generator is integral with at least one of the racks.

* * * * *